(12) United States Patent
Subramanian et al.

(10) Patent No.: US 8,011,886 B2
(45) Date of Patent: Sep. 6, 2011

(54) METHOD AND APPARATUS FOR INCREASING LIFT ON WIND TURBINE BLADE

(75) Inventors: Balaji Subramanian, Chennai (IN); Kevin Richard Kirtley, Simpsonville, SC (US); Kevin James Standish, Erie, CO (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/494,895

(22) Filed: Jun. 30, 2009

(65) Prior Publication Data

US 2010/0143152 A1     Jun. 10, 2010

(51) Int. Cl.
*F03D 1/06* (2006.01)
(52) U.S. Cl. .................................. 416/23; 416/231 B
(58) Field of Classification Search .............. 416/227 R, 416/227 A, 231 R, 231 A, 231 B, 23, 24, 416/87, 88, 89, 175
See application file for complete search history.

(56) References Cited

U.S. PATENT DOCUMENTS

| | | | |
|---|---|---|---|
| 2,026,482 A * | 12/1935 | Mattioli | 416/231 B |
| 2,716,460 A * | 8/1955 | Young | 416/24 |
| 4,710,101 A * | 12/1987 | Jamieson | 416/87 |
| 5,096,378 A * | 3/1992 | Jamieson | 416/23 |
| 6,457,671 B1 * | 10/2002 | Sherman | 416/227 R |
| 6,840,741 B1 | 1/2005 | Wake et al. | |
| 6,910,867 B2 | 6/2005 | Corten | |
| 6,966,758 B2 | 11/2005 | Grabau et al. | |
| 7,293,959 B2 | 11/2007 | Pedersen et al. | |
| 2007/0025859 A1 | 2/2007 | Jacobsen | |
| 2007/0297909 A1 | 12/2007 | Wobben | |
| 2008/0166235 A1 | 7/2008 | Standish et al. | |

FOREIGN PATENT DOCUMENTS

| | | | |
|---|---|---|---|
| EP | 1674723 A2 | | 6/2006 |
| GB | 2185788 A | * | 7/1987 |
| JP | 2009074447 A | * | 4/2009 |
| WO | 2004097215 A1 | | 11/2004 |

OTHER PUBLICATIONS

JPO Machine Translation of JP 2009074447A. Accessed Oct. 14, 2010. 12 pages.*

* cited by examiner

*Primary Examiner* — Richard Edgar
(74) *Attorney, Agent, or Firm* — James McGinness, Esq.; Armstrong Teasdale LLP

(57) ABSTRACT

A lift device for a wind turbine blade. The lift device includes a first sidewall and an opposing second sidewall. The lift device is configured to be coupled to the wind turbine blade along a leading edge of the wind turbine blade, and to generate lift when airflow is directed across a surface of the lift device.

16 Claims, 6 Drawing Sheets

METHOD AND APPARATUS FOR INCREASING LIFT ON WIND TURBINE BLADE

BACKGROUND OF THE INVENTION

The subject matter described herein relates generally to wind turbines and, more particularly, to a method and apparatus for increasing lift on a wind turbine blade.

Wind turbines convert the kinetic energy of wind into electrical energy. Wind turbines include one or more blades that rotate when oncoming wind strikes the blades. The flow of wind over the wind turbine blades generates lift and provides torque to generate power. As such, the amount of energy that a wind turbine can extract from the wind is directly related to the lift generated on the blades. The amount of lift generated on the blades depends on a number of factors. These factors include a speed of the wind, a lift coefficient of the blades, a planform area of the blades, and an air density of the wind.

One technique that is used to increase lift, and thereby increase energy extracted by the wind turbine, is to increase the planform area of the blades. However, larger blades are more expensive, and may present structural issues in the wind turbine due to their larger weight. An additional technique for increasing lift is to pitch the blades such that an angle of attack is increased, thus increasing the lift coefficient. However, increasing the angle of attack above a critical angle of attack may result in air flow separation over the blades, thus stalling the blades. When stall occurs, lift generated by the blades decreases significantly and a large component of the torque is lost. Solutions that provide an ability to diminish or delay flow separation will allow the wind turbine blade to maximize lift.

BRIEF DESCRIPTION OF THE INVENTION

In one embodiment, lift device for a wind turbine blade includes a first sidewall and an opposing second sidewall. The lift device is configured to be coupled to the wind turbine blade along a leading edge of the wind turbine blade, and to generate lift when airflow is directed across at least one of the first sidewall and the second sidewall.

In another embodiment, a wind turbine blade includes a first sidewall and an opposing second sidewall, and the blade defines a leading edge and an opposing trailing edge. The blade includes a lift device configured to generate lift when airflow is directed across a surface of the lift device. The blade also includes a coupling mechanism that couples the lift device to the blade along the leading edge of the blade.

In another embodiment, a method for assembling a wind turbine includes coupling at least one blade to the wind turbine. The blade includes a first sidewall and an opposing second sidewall, and the blade defines a leading edge and an opposing trailing edge. The method also includes coupling a lift device to the blade along the leading edge, such that the lift device is configured to generate lift when airflow is directed across a surface of the lift device.

DETAILED DESCRIPTION OF THE INVENTION

Figure 1:
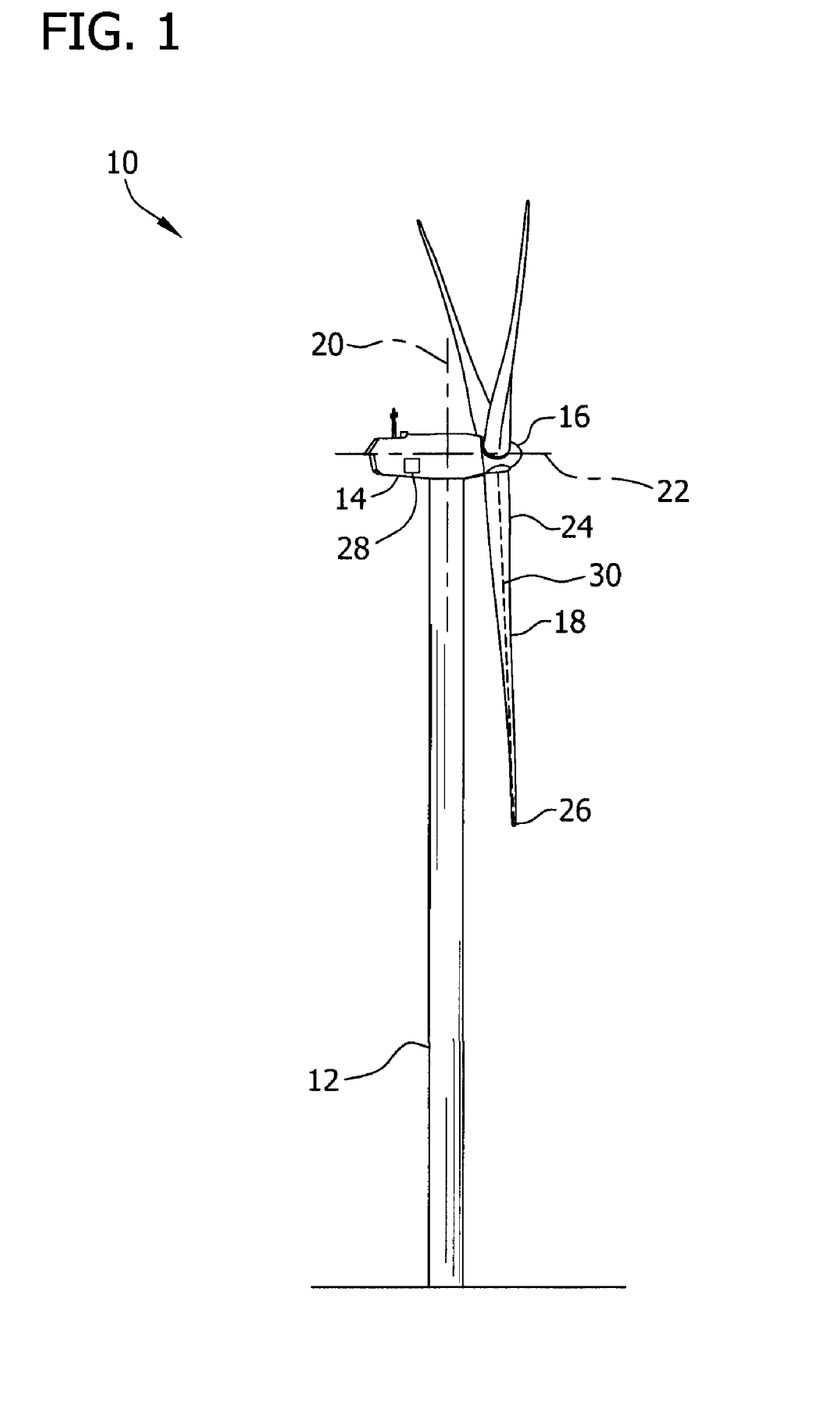
FIG. 1 is a perspective side view of an exemplary wind turbine.

FIG. 1 illustrates an exemplary wind turbine 10. In the exemplary embodiment, wind turbine 10 includes a tower 12, a nacelle 14 that is coupled to tower 12, a hub 16 that is coupled to nacelle 14, and at least one blade 18 that is coupled to hub 16. Tower 12 provides support for nacelle 14, hub 16, and blade 18. Tower 12 may have any suitable height and/or construction as is known in the art.

Nacelle 14 is coupled to tower 12. Nacelle 14 typically houses components (not shown) for use in transforming rotational energy of blade 18 into electricity. Nacelle 14 may be constructed as is known in the art. Hub 16 is coupled to nacelle 14. Hub 16 provides a rotatable housing for at least one blade 18. Hub 16 may be constructed as is known in the art.

At least one blade 18 is coupled to hub 16. In the exemplary embodiment, three blades 18 are coupled to hub 16. More specifically, each blade 18 is coupled to hub 16 at a blade root portion 24. Each blade 18 extends outward from hub 16 from blade root portion 24 to a blade tip portion 26 along a blade axis 30. Blades 18 are rotatable about an axis of rotation 22 when wind strikes blades 18. In the exemplary embodiment, each blade 18 is oriented substantially perpendicularly to the ground. Each blade 18 rotates through substantially the same plane of rotation that is substantially parallel to a centerline axis 20 of tower 12.

During operation, as wind strikes blades 18, blades 18 are rotated about hub 16, and the kinetic energy of the wind is transformed into rotational energy by blades 18. More specifically, rotation of blades 18 rotates an axle that is coupled to a gearbox (not shown) within nacelle 14. The gearbox is coupled to a generator (not shown) within nacelle 14 which generates electricity. In the exemplary embodiment, a pitch of each blade 18 is controlled individually by a control system 28. Alternatively, the blade pitch for all blades 18 may be controlled simultaneously by control system 28.

In the exemplary embodiment, control system 28 is shown as being centralized within nacelle 14, however, control system 28 may be a distributed system throughout wind turbine 10, within a wind farm, and/or at a remote control center. Control system 28 includes a processor configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels may include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a PLC cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, flow control system control commands. The execution of sequences of instructions is not limited to any specific combination of hardware circuitry and software instructions.

Figure 2:
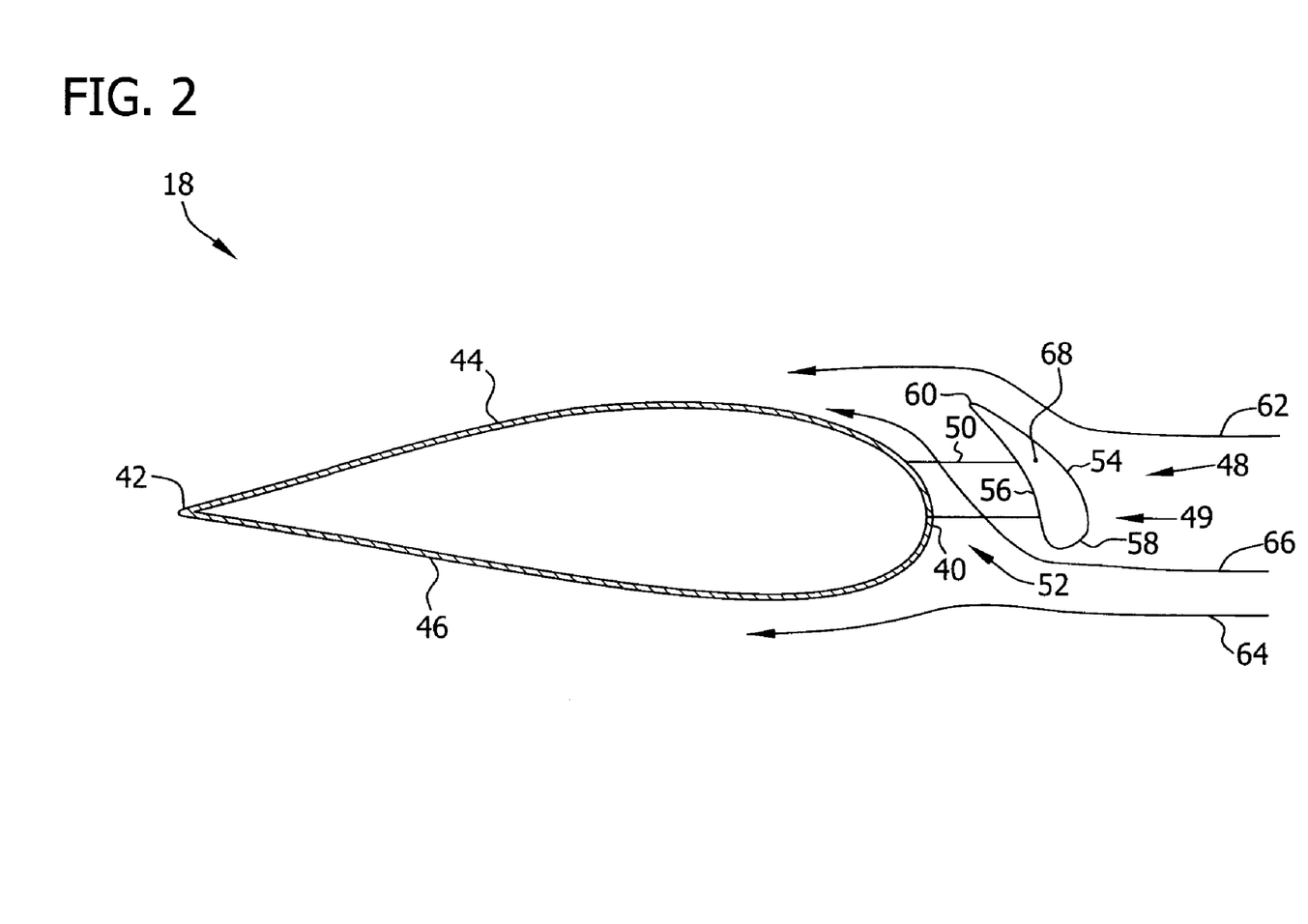
FIG. 2 is a side cross-section view of an exemplary wind turbine blade, including an exemplary lift device suitable for use with the wind turbine shown in FIG. 1.
Figure 3:
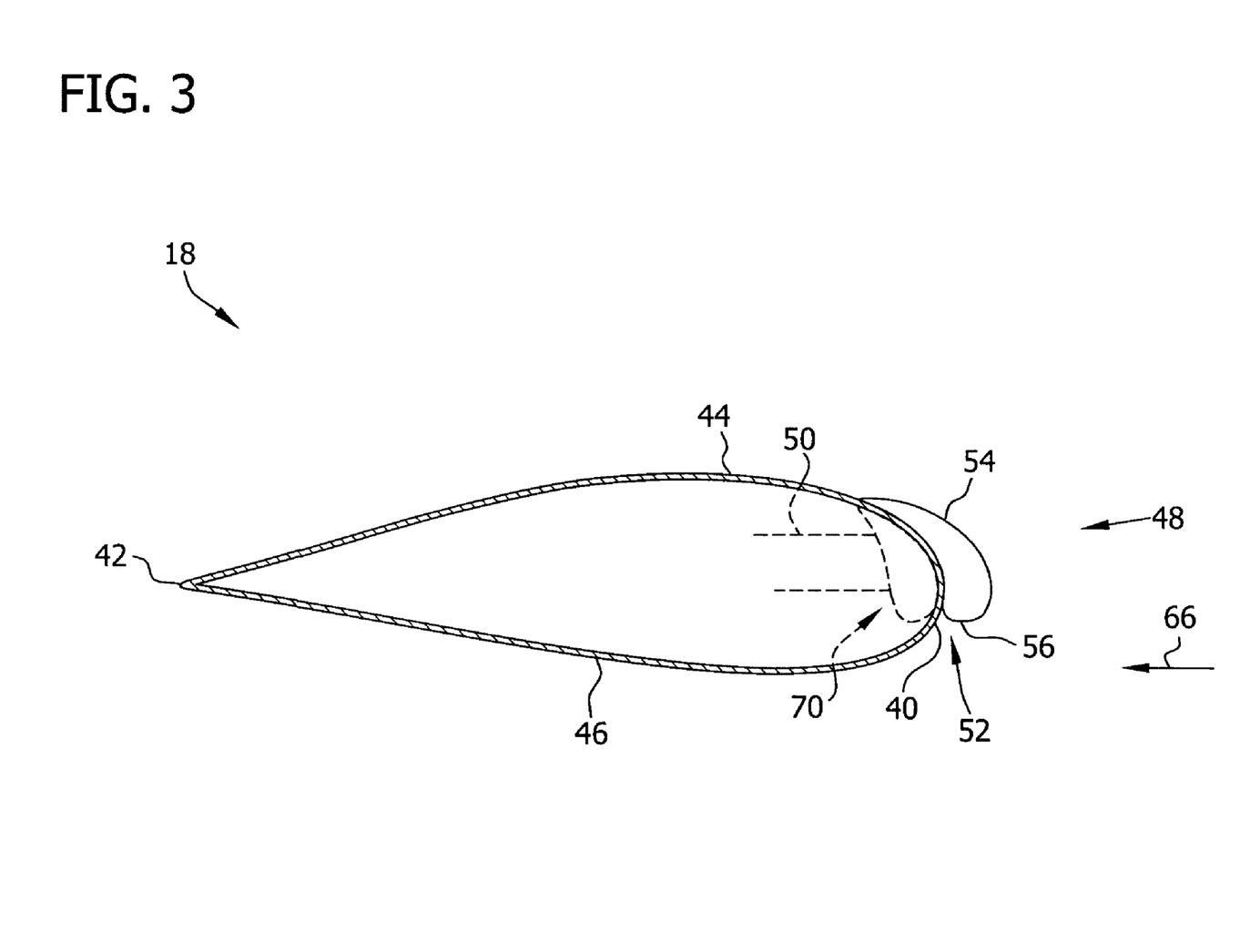
FIG. 3 is a side cross-section view of an exemplary wind turbine blade, including an alternative configuration of the lift device shown in FIG. 2.

FIG. 2 illustrates an exemplary blade 18 and an exemplary lift device 48 that may be used with wind turbine 10 (shown in FIG. 1). FIG. 3 illustrates lift device 48 in a retracted position with respect to blade 18. In the exemplary embodiment, blade 18 includes a first sidewall 44 and an opposite second sidewall 46. First sidewall 44 is coupled to second sidewall 46 along a leading edge 40 and along an opposing trailing edge 42 to facilitate forming an airfoil shape. Leading edge 40 extends from blade root portion 24 (shown in FIG. 1) to blade tip portion 26 (shown in FIG. 1). In the exemplary embodiment, a profile of leading edge 40 axially curves as leading edge 40 extends from blade root portion 24 to blade tip portion 26. More specifically, an angle of attack of blade 18 near root portion 24 is different than an angle of attack of blade 18 near tip portion 26. In an alternative embodiment, the profile of blade 18 is substantially uniform as leading edge 40 extends from blade root portion 24 to blade tip portion 26. As used herein, the term "axial" or "axially" refers to a direction along or substantially parallel to blade axis 30 (shown in FIG. 1). As used herein, the term "radial" or "radially" refers to a direction substantially perpendicular to blade axis 30.

In the exemplary embodiment, lift device 48 is coupled to leading edge 40 of blade 18 via a coupling mechanism 50. In an alternative embodiment, lift device 48 is coupled to blade 18 in any suitable location that allows lift device 48 to function as described herein. In the exemplary embodiment, lift device 48 includes an airfoil 49 that has a first sidewall 54 and an opposite second sidewall 56 that define a leading edge 58 and an opposing trailing edge 60. In the exemplary embodiment, lift device 48 extends radially outward and downward from leading edge 40 of blade 18. Lift device 48 may be constructed using any suitable material including, without limitation, a suitable metal, wood, glass, plastic and/or composite material and combinations thereof. Lift device 48 may be formed from a single section or piece of material, or alternatively, first and second sidewalls 54 and 56 may be separate sections or pieces that are coupled together at leading edge 58 and trailing edge 60. In the exemplary embodiment, lift device 48 is constructed with solid sidewalls 54 and 56 such that lift device 48 has a solid profile suitable for withstanding wind and weather conditions.

In the exemplary embodiment, at least a portion of a profile of leading edge 58 of lift device 48 substantially conforms to the profile of a corresponding portion of leading edge 40 of blade 18. As such, in the exemplary embodiment, the profile of lift device 48 axially curves as lift device 48 extends from blade root portion 24 towards blade tip portion 26. In an alternative embodiment, the profile of lift device 48 is substantially uniform as lift device 48 extends from blade root portion 24 towards blade tip portion 26. In the exemplary embodiment, a pitch angle of lift device 48 is different than a pitch angle of blade 18, i.e. greater than or less than a pitch angle of blade 18. As such, an angle of attack of lift device 48 is different than an angle of attack of blade 18, i.e. greater than or less than an angle of attack of lift device 48 relative to oncoming airflow.

In the exemplary embodiment, coupling mechanism 50 is retractable, such that lift device 48 may be extended or retracted with respect to leading edge 40 as desired. In the extended position (shown in FIG. 2), an airflow channel 52 is formed between second sidewall 56 of lift device 48 and leading edge 40 of blade 18. In the retracted position (shown in FIG. 3), airflow channel 52 is substantially closed. In the exemplary embodiment, while in the retracted position, coupling mechanism 50 is at least partially housed within blade 18. Coupling mechanism 50 may include any suitable mechanism or component to retract and extend lift device 48 including, without limitation, a hydraulic, pneumatic, and/or electric mechanism or component. Coupling mechanism 50 may be configured to tilt or pitch lift device 48 by rotation about a pivot point 68 in addition to retracting or extending lift device 48. In an alternative embodiment, coupling mechanism 50 is fixedly coupled to blade 18 and lift device 48 such that lift device 48 may not be retracted and/or pitched.

During operation, as air flows towards blade 18, air impacts lift device 48 along leading edge 58. In the exemplary embodiment, a first partial flow of air 62 is directed across first sidewall 54 of lift device 48 and further across first sidewall 44 of blade 18. First partial flow of air 62 creates a low pressure zone above first sidewall 44 of blade 18 due to a camber of lift device 48 and a camber of blade 18. A second partial flow of air 64 is directed underneath lift device 48 and second sidewall 46 of blade 18. Second partial flow of air 64 creates a high pressure zone below second sidewall 46 of blade 18, thereby inducing lift to blade 18. In the exemplary embodiment, when lift device 48 is extended, a third partial flow of air 66 is directed into airflow channel 52. Third partial flow of air 66 facilitates delaying a separation of the first partial flow of air from first sidewall 44 of blade 18. In the exemplary embodiment, the extension of lift device 48 facilitates diminishing and/or delaying stall in blade 18.

The angle of attack of blade 18 may increase due to pitching of blade 18, due to rotation of blade 18 about axis of rotation 22 (shown in FIG. 1), or due to changes in wind direction. As angle of attack of blade 18 increases, more airflow is directed through airflow channel 52 and separation of the first partial airflow from first sidewall 44 of blade 18 is reduced. As such, by operation of lift device 48, stall conditions can be diminished and/or delayed.

As shown in FIG. 3, lift device 48 may be retracted by coupling mechanism 50 to reduce drag on blade 18. In such operation, airflow channel 52 is substantially closed such that third partial flow of air 66 is prevented from flowing between second sidewall 56 of lift device 48 and leading edge 40 of blade 18. When lift device 48 is fully retracted, lift device 48 is substantially flush with leading edge 40 of blade 18. In an alternative embodiment, leading edge 40 of blade 18 may be constructed with an opening or void 70 that substantially conforms to dimensions of lift device 48. In such embodiment, lift device 48 may be retracted into opening 70 such that second sidewall 56 of lift device 48 is housed within blade 18, and first sidewall 54 of lift device 48 is substantially flush with an outer surface of first sidewall 44 of blade 18. When lift device 48 is retracted, blade 18 aerodynamically performs substantially the same as a blade that does not include lift device 48.

In the exemplary embodiment, control system 28 (shown in FIG. 1) is operatively coupled to lift device 48 and to coupling mechanism 50. Control system 28 includes one or more sensors that measure environmental conditions, such as a wind speed, a speed of rotation of blades 18, and/or a direction of wind. The sensors provide feedback of the measured environmental conditions to control system 28. Based on the feedback from the sensors, control system 28 pitches, retracts, and/or extends lift device 48 as needed to optimize lift and minimize an amount of drag generated by lift device 48. In the exemplary embodiment, lift device 48 is extended during low wind speeds, until a cut-out speed is reached at higher wind speeds. After the cut-out speed is reached, lift device 48 is retracted by coupling mechanism 50 and control system 28 to prevent damage to wind turbine 10 and to reduce drag and loading on blade 18.

Lift device 48 facilitates reducing a separation of airflow from blade 18 as the angle of attack increases. As such, blade 18 may operate at a higher angle of attack than otherwise possible without lift device 48. In other words, blade 18 with lift device 48 has a higher critical angle of attack than a wind turbine blade without lift device 48. Simulations indicate that a lift device 48 may facilitate increasing the critical angle of attack of a blade by more than 40% at low wind speeds. Lift induced to blade 18 is directly proportional to the angle of attack up to the critical angle of attack. As such, lift device 48 induces higher lift to blade 18, thereby increasing the torque and electrical power generated by blade 18.

In an alternative embodiment, a portion of lift device 48 substantially seals a portion of airflow channel 52 with coupling mechanism 50 in the extended position. In such embodiment, air does not flow through airflow channel 52, but rather air is directed along first sidewall 44 and second sidewall 46 of blade 18, along first sidewall 54 of lift device 48, and underneath lift device 48.

Aerodynamic properties of lift device 48 and blade 18 may be modified to achieve desired results. For example, the pitch angle of lift device 48 may be increased or decreased with respect to blade 18 to achieve different airflow properties. Additionally, a shape, a size, a camber, and/or construction of lift device 48 may be modified as desired to achieve desired aerodynamic properties. Moreover, a distance that lift device 48 is extendable by coupling mechanism 50 may be modified, thus altering the dimensions and aerodynamic effect of airflow channel 52.

Figure 4:
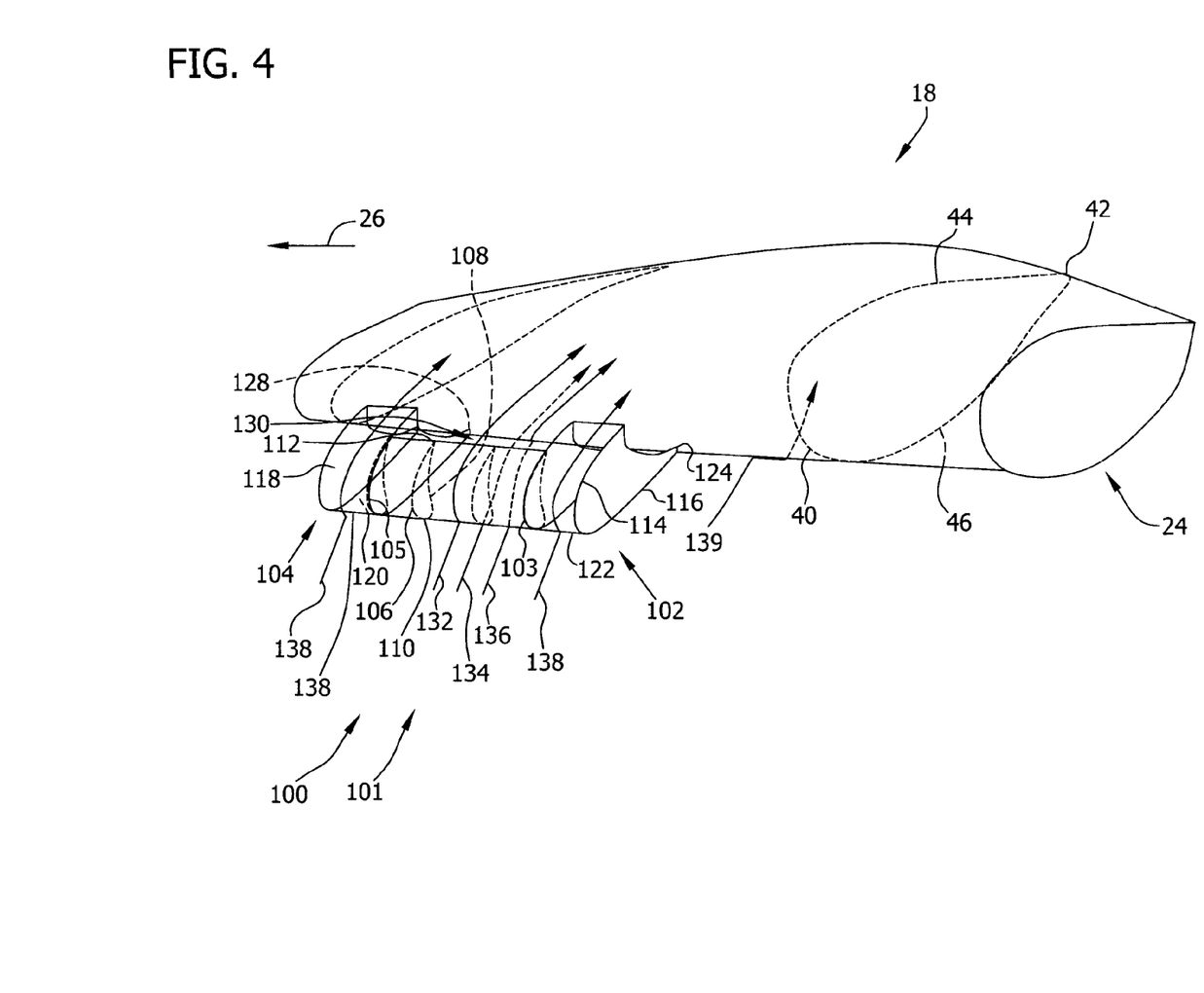
FIG. 4 is a perspective view of a portion of an exemplary wind turbine blade including a secondary lift device suitable for use with the wind turbine shown in FIG. 1.
Figure 5:
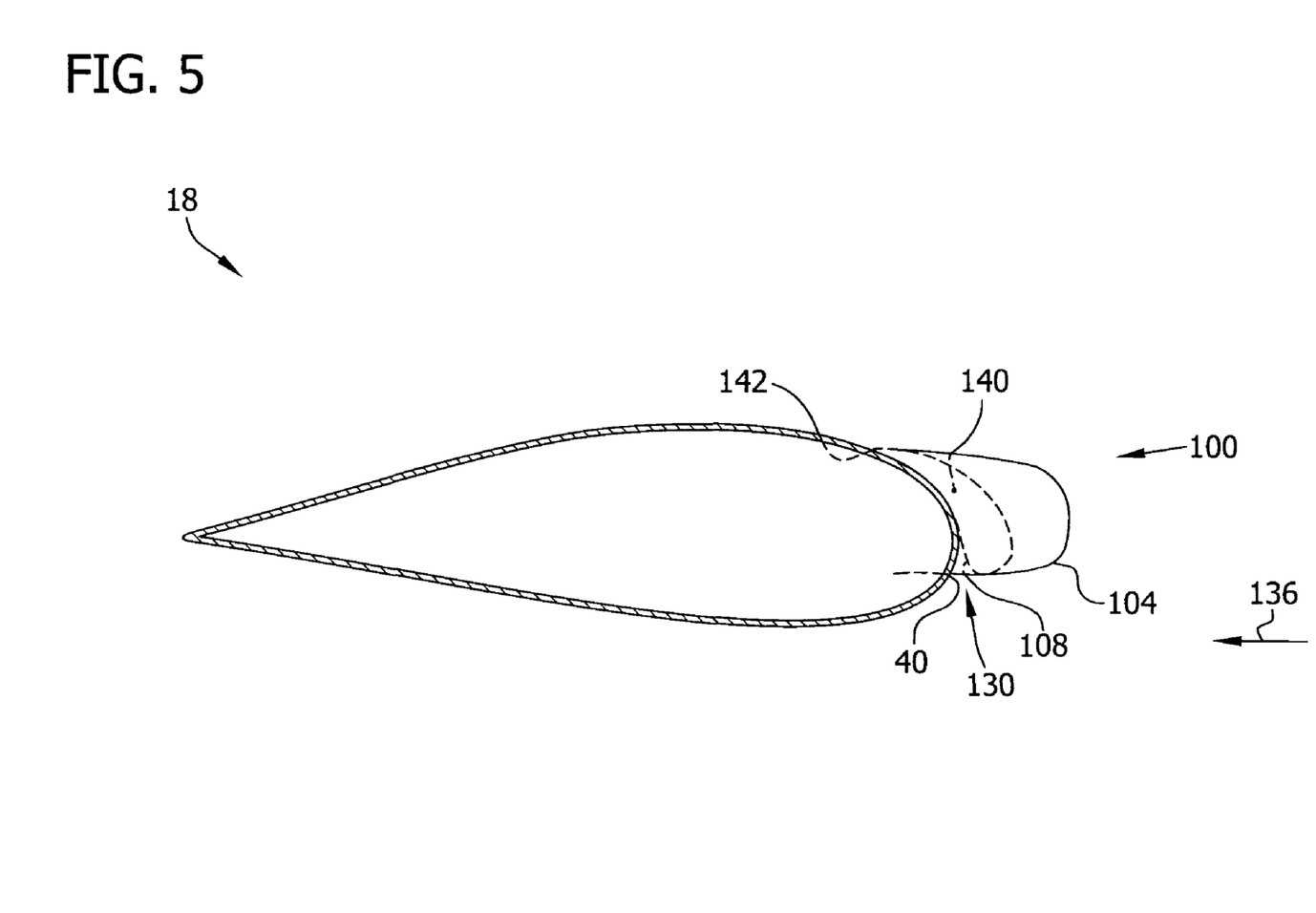
FIG. 5 is a side cross-section view of an exemplary wind turbine blade, including an alternative configuration of the secondary lift device shown in FIG. 4.

FIG. 4 illustrates a section of blade 18 and a secondary lift device 100 suitable for use with wind turbine 10 (shown in FIG. 1). FIG. 5 illustrates secondary lift device 100 in a retracted position with respect to blade 18. Blade 18 is described with reference to FIGS. 1, 2, and 3, and components are identified with similar reference numerals in FIG. 4. As such, blade 18 includes first sidewall 44 and second sidewall 46, leading edge 40, and trailing edge 42. Secondary lift device 100 is coupled to blade 18. In the exemplary embodiment, secondary lift device 100 is coupled to blade 18 with an axially inner or first coupling member 102 and an axially outer or second coupling member 104. Secondary lift device 100 may be used independently, or in combination with lift device 48 (shown in FIG. 2). In the exemplary embodiment, lift device 48 is used in combination with secondary lift device 100.

In the exemplary embodiment, secondary lift device 100 includes a first sidewall 106 and an opposite second sidewall 108 that define a leading edge 110 and an opposing trailing edge 112 to facilitate forming an airfoil shape. In the exemplary embodiment, first sidewall 106 and/or second sidewall 108 are cambered. In the exemplary embodiment, secondary lift device 100 includes an airfoil 101. An axially inner end 103 of secondary lift device 100 is coupled to inner coupling member 102, and an axially outer end 105 of secondary lift device 100 is coupled to outer coupling member 104 to facilitate producing a desired aerodynamic effect. In the exemplary embodiment, secondary lift device 100 is coupled to blade 18 such that a secondary airflow channel 130 is created between leading edge 40 of blade 18 and a trailing edge 112 of secondary lift device 100. In an alternative embodiment, a portion of secondary lift device 100, such as coupling members 102 and/or 104, substantially seals a portion of secondary airflow channel 130. In such embodiment, at least a portion of air does not flow through secondary airflow channel 130, but rather at least a portion of air is directed along first sidewall 106 of secondary lift device 100 and along first sidewall 44 and second sidewall 46 of blade 18, and underneath secondary lift device 100, as more fully described below.

Secondary lift device 100 may be constructed using any suitable material including, without limitation, a suitable metal, wood, glass, plastic and/or composite material and combinations thereof. Secondary lift device 100 may be formed from a single section or piece of material, or alternatively, first and second sidewalls 106 and 108 may be separate sections or pieces that are coupled together at leading edge 110 and trailing edge 112. In the exemplary embodiment, secondary lift device 100 is constructed with solid sidewalls 106 and 108 such that secondary lift device 100 has a solid profile suitable for withstanding wind and weather conditions.

In the exemplary embodiment, inner coupling member 102 includes a first sidewall 114 and an opposite second sidewall 116 that define a leading edge 122 and an opposing trailing edge 124. Outer coupling member 104 includes a first sidewall 118 and an opposite second sidewall 120 that define a leading edge 126 and an opposing trailing edge 128. In the exemplary embodiment, inner and outer coupling members 102 and 104 are coupled to blade 18 along leading edge 40, such that inner and outer coupling members 102 and 104 substantially conform to respective portions of leading edge 40. More specifically, in the exemplary embodiment, secondary lift device 100 is coupled to blade 18 using inner and outer coupling members 102 and 104 along leading edge 40 at or near blade root portion 24.

In the exemplary embodiment, secondary lift device 100 is immovably or fixedly coupled to blade 18 via inner and outer coupling members 102 and 104. In an alternative embodiment (shown in FIG. 5), secondary lift device 100 is movably, such as pivotally and/or retractably coupled to blade 18 via inner and outer coupling members 102 and 104 such that secondary lift device 100 and/or inner and outer coupling members 102 and 104 may pivot about a pivot point 140 or be retracted into blade 18, as desired. More specifically, in the retracted position (shown in FIG. 5), secondary airflow channel 130 is substantially closed such that third partial flow of air 136 is prevented from flowing between second sidewall 108 of secondary lift device 100 and leading edge 40 of blade 18. When secondary lift device 100 is fully retracted, secondary lift device 100 is substantially flush with leading edge 40 of blade 18. In one embodiment, at least a portion 142 of inner and outer coupling members 102 and 104 retract into blade 18 when secondary lift device 100 is fully retracted.

During operation, as air flows towards blade 18, air impacts secondary lift device 100 along leading edge 110. A first partial flow of air 132 is directed across first sidewall 106 of secondary lift device 100 and further across first sidewall 44 of blade 18. First partial flow of air 132 creates a low pressure zone above first sidewall 44 due to a camber of secondary lift device 100 and a camber of blade 18. A second partial flow of air 134 is directed across second sidewall 108 of secondary lift device 100 and further across second sidewall 46 of blade 18. Second partial flow of air 134 creates a high pressure zone below second sidewall 46 of blade 18, thereby inducing lift to blade 18. In the exemplary embodiment, a third partial flow of air 136 is directed across second sidewall 108 of secondary lift device 100, into secondary airflow channel 130, and across first sidewall 44 of blade 18. Third partial flow of air 136 facilitates delaying a separation of first partial flow of air 132 from first sidewall 44 of blade 18. In the exemplary embodiment, secondary lift device 100 facilitates diminishing and/or delaying stall in blade 18.

As air flows towards blade 18, air also impacts inner and/or outer coupling members 102 and 104. A fourth partial flow of air 138 is directed across first sidewall 114 and/or second sidewall 118 of inner and outer coupling members 102 and 104 and further across first sidewall 44 of blade 18. A fifth partial flow of air 139 does not contact secondary lift device 100, but rather is directed across first sidewall 44 and/or second sidewall 46 of blade 18. Due to a camber of inner coupling member 102 and outer coupling member 104, one or more vortices of air flow are created within fourth partial flow of air 138 that flow across first sidewall 44 of blade 18 on either side of third partial flow of air 136. These vortices facilitate replenishing a boundary layer of air flow across first sidewall 44 of blade 18. More specifically, the vortices interrupt a natural spanwise, or radially outward, migration of weak boundary layer air flow emanating from blade root portion 24. Specifically, an increase in mixing energy that is created by secondary lift device 100 coupled between inner coupling member 102 and outer coupling member 104 blocks the spanwise migration of weak boundary layer air flow and improves a two-dimensional air flow pattern of a larger portion of blade 18. As such, secondary lift device 100 and inner coupling member 102 and outer coupling member 104 facilitate overcoming poor aerodynamic performance near blade root portion 24 and facilitate increasing lift induced to blade root portion 24, thus enabling a more axially uniform flow of air from blade tip portion 26 to hub 16.

Aerodynamic properties of secondary lift device 100 may be modified to achieve desired results. For example, a pitch angle of secondary lift device 100 may be increased or decreased with respect to blade 18 to achieve different airflow properties. Additionally, a shape, a size, a camber, and/or construction of secondary lift device 100 may be modified as desired to achieve desired aerodynamic properties. Moreover, a distance that secondary lift device 100 is extendable by inner and outer coupling members 102 and 104 may be modified, thus altering dimensions and aerodynamic effect of secondary airflow channel 130.

Further, existing wind turbine blades may be retrofitted with lift device 48 and/or secondary lift device 100 without a need for substantial blade modification. As such, traditional wind turbine blades may still be used while achieving improved aerodynamic performance.

Figure 6:
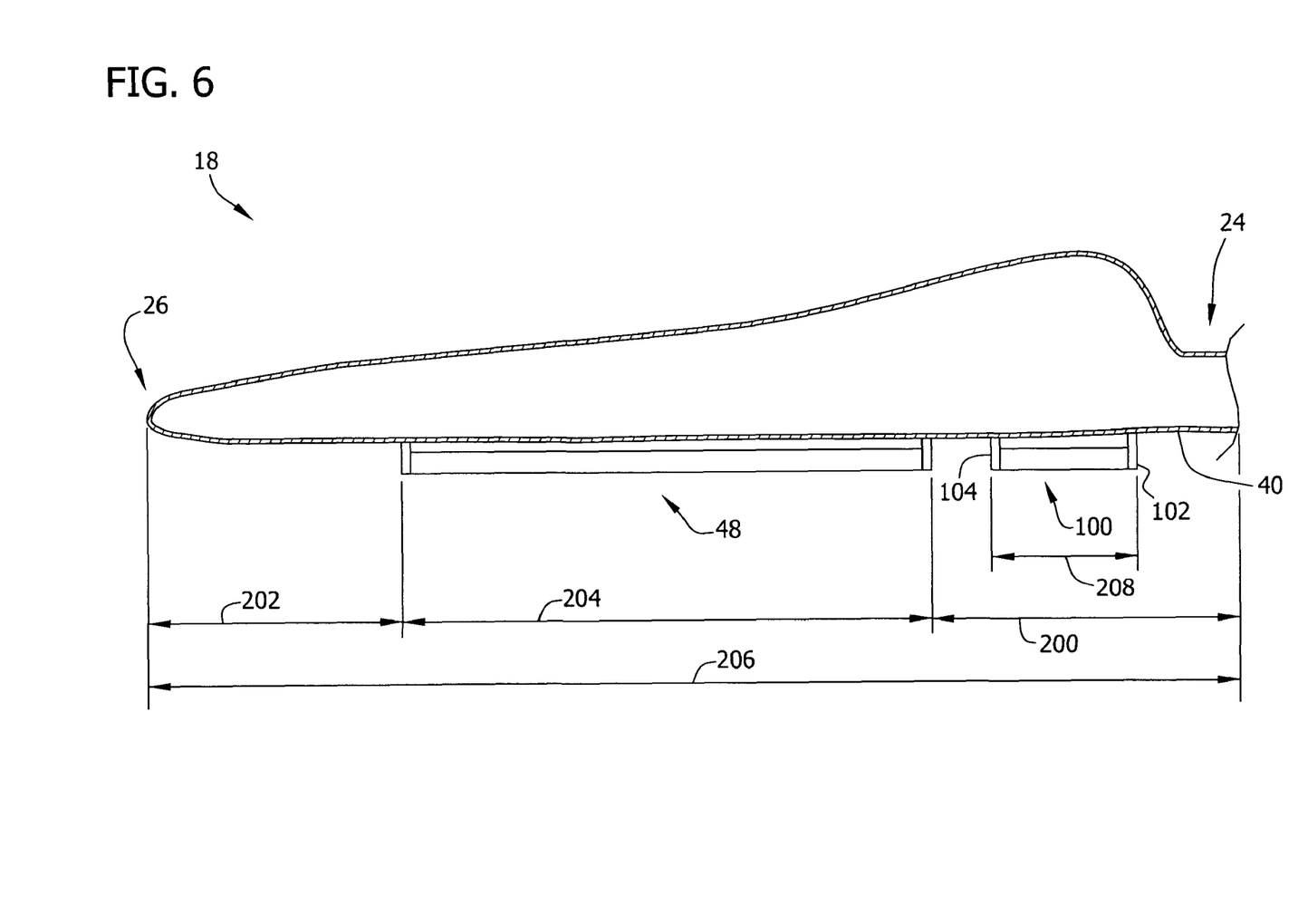
FIG. 6 is a perspective view of an exemplary wind turbine blade, including the lift device shown in FIG. 2 and the secondary lift device shown in FIG. 4.

FIG. 6 illustrates a perspective view of an exemplary blade 18, an exemplary lift device 48, and an exemplary secondary lift device 100 that may be used with wind turbine 10 (shown in FIG. 1). In the exemplary embodiment, lift device 48 does not extend completely along leading edge 40 of blade 18 from blade root portion 24 to blade tip portion 26. Rather, lift device 48 is offset by a first predefined offset distance 200 from blade root portion 24, extends along leading edge 40 of blade 18, and terminates at a second predefined offset distance 202 from blade tip portion 26. As such, lift device 48 has an axial length 204 that is shorter than an axial length 206 of blade 18. In the exemplary embodiment, lift device 48 is offset from blade root portion 24 by first predefined offset distance 200 that is approximately 25% of axial length 206 of blade 18, and extends to second predefined offset distance 202 of approximately 25% of axial length 206 of blade 18 from blade tip portion 26. As such, in the exemplary embodiment, axial length 204 of lift device 48 is approximately 50% of axial length 206 of blade 18. In an alternative embodiment, first predefined offset distance 200 and/or second predefined offset distance 202 is less than or greater than 25% of axial length 206 of blade 18, but greater than 0%. In an alternative embodiment, first predefined offset distance 200 and second predefined offset distance 202 are both approximately 0%, such that lift device 48 extends substantially the full axial length 206 of blade 18 from root portion 24 to tip portion 26.

In the exemplary embodiment, blade 18 includes lift device 48 and secondary lift device 100. In the exemplary embodiment, an axial length 208 of secondary lift device 100 is less than axial length 206 of blade 18. More specifically, in the exemplary embodiment, axial length 208 of secondary lift device 100 is less than axial length 204 of lift device 48. In the exemplary embodiment, secondary lift device 100 is coupled to blade 18, via inner and outer coupling members 102 and 104, along leading edge 40 axially between blade root portion 24 and lift device 48.

The above-described embodiments facilitate providing an efficient and cost-effective increase in wind turbine power generation. More power may be captured from a given wind speed due to the ability of the blades to utilize a higher angle of attack and a higher lift coefficient. Simulation data indicates that lift device 48 and secondary lift device 100 may facilitate increasing the critical angle of attack by more than 40%. The lift devices described herein facilitate a reduction in size of wind turbine blades while still generating substantially the same power rating as larger conventional blades. This facilitates decreasing the weight and loading of a wind turbine and also facilitates decreasing the cost of the overall wind turbine system. The above described embodiments also facilitate decreasing the pitch frequency of wind turbine blades because of the higher power capture capability of the lift device. Moreover, the lift devices may be retracted during high wind speed events to facilitate protecting the blades and wind turbine components.

Exemplary embodiments of a wind turbine, a high lift device, and a method for increasing lift induced to wind turbine blades are described above in detail. The turbine, device, and method are not limited to the specific embodiments described herein, but rather, components of the turbine, device and/or steps of the method may be utilized independently and separately from other components and/or steps described herein. For example, the device may also be used in combination with other high lift systems and methods, and is not limited to practice with only the wind turbine and method as described herein. Rather, the exemplary embodiment can be implemented and utilized in connection with many other wind turbine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A lift device for a wind turbine blade, said lift device comprising:
   a first airfoil comprising a first sidewall and an opposing second sidewall, said lift device configured to be coupled to the wind turbine blade along a leading edge of the wind turbine blade, and to generate lift when airflow is directed across at least one of said first sidewall and said second sidewall, wherein an axial profile of said lift device substantially conforms to an axial profile of a corresponding portion of the wind turbine blade;
   a second airfoil positioned proximate said first airfoil, said second airfoil having an axial length that is less than an axial length of said first airfoil; and,
   at least one coupling member for coupling said second airfoil to the wind turbine blade, said at least one coupling member comprising a curved sidewall configured to replenish a boundary layer of air proximate the wind turbine blade when a flow of air is directed across said curved sidewall and the wind turbine blade.

2. A lift device in accordance with claim 1, wherein said lift device defines an airflow channel between said first airfoil and the leading edge of the wind turbine blade.

3. A lift device in accordance with claim 1, wherein said first airfoil is configured to be retractably coupled to the wind turbine blade.

4. A lift device in accordance with claim 1, wherein the wind turbine blade has a first length in an axial direction of the wind turbine blade and said first airfoil has a second length in the axial direction shorter than the first length.

5. A lift device in accordance with claim 4, wherein said first airfoil is offset from a root portion of the wind turbine blade by a distance that is approximately 25% of the first length.

6. A lift device in accordance with claim 1, wherein said second airfoil is configured to be coupled to the leading edge of the wind turbine blade and positioned axially between said first airfoil and a root portion of the wind turbine blade.

7. A wind turbine blade, comprising:
   a first sidewall and an opposing second sidewall, said wind turbine blade defining a leading edge and an opposing trailing edge;
   a lift device configured to generate lift when airflow is directed across a surface of said lift device, wherein an axial profile of said lift device substantially conforms to an axial profile of a corresponding portion of said wind turbine blade, said lift device comprising a first airfoil and a second airfoil positioned proximate said first airfoil, said second airfoil having an axial length less than an axial length of said first airfoil;
   a coupling mechanism coupling said first airfoil to said wind turbine blade along said leading edge; and,
   at least one coupling member coupling said second airfoil to said wind turbine blade, said at least one coupling member comprising a curved sidewall configured to replenish a boundary layer of air proximate said wind turbine blade when a flow of air is directed across said curved sidewall and said wind turbine blade.

8. A wind turbine blade in accordance with claim 7, wherein said lift device is operatively coupled to a control system, and the control system is configured to pitch said lift device to a desired angle.

9. A wind turbine blade in accordance with claim 7, wherein said first airfoil is retractably coupled to said wind turbine blade.

10. A wind turbine blade in accordance with claim 7, wherein said wind turbine blade has a first length in an axial direction of said wind turbine blade and said first airfoil has a second length in the axial direction shorter than the first length.

11. A wind turbine blade in accordance with claim 7, wherein said second airfoil is coupled to said leading edge of said wind turbine blade and positioned axially between said first airfoil and a root portion of said wind turbine blade.

12. A wind turbine blade in accordance with claim 7, wherein said first airfoil has a pitch angle that is different than a pitch angle of said wind turbine blade.

13. A method for assembling a wind turbine, said method comprising:
   coupling at least one wind turbine blade to the wind turbine, the wind turbine blade including a first sidewall and an opposing second sidewall, the wind turbine blade defining a leading edge and an opposing trailing edge; and,
   coupling a lift device to the wind turbine blade along the leading edge, the lift device configured to generate lift when airflow is directed across a surface of the lift device, wherein an axial profile of the lift device substantially conforms to an axial profile of a corresponding portion of the wind turbine blade, and wherein the lift device includes a first airfoil and a second airfoil positioned proximate the first airfoil, the second airfoil having an axial length less than an axial length of the first airfoil, wherein the second airfoil is coupled to the wind turbine blade with at least one coupling member having a curved sidewall such that a boundary layer of air proximate the wind turbine blade is replenished when a flow of air is directed across the curved sidewall and the wind turbine blade.

14. A method in accordance with claim 13, wherein coupling a lift device to the wind turbine blade comprises coupling the first airfoil to at least one of the first sidewall and the second sidewall.

15. A method in accordance with claim 14, further comprising forming the first airfoil such that the wind turbine blade has a first length in an axial direction of the wind turbine blade and the first airfoil has a second length in the axial direction shorter than the first length.

16. A method in accordance with claim 14, further comprising coupling the second airfoil to the wind turbine blade along the leading edge, the second airfoil positioned axially between the first airfoil and a root portion of the wind turbine blade.

* * * * *